Patented May 12, 1931

1,805,146

UNITED STATES PATENT OFFICE

LAURITS A. LAURSEN, OF AKRON, OHIO, ASSIGNOR OF ONE-FOURTH TO PEARL LUCILE LAURSEN, OF AKRON, OHIO

RUBBER TIRE AND PROCESS OF MAKING

No Drawing.  Application filed November 24, 1925. Serial No. 71,475.

To convey a full understanding of my present invention, with its merits and advantages, I propose to refer briefly to certain rubber tire manufacturing practise, and to known facts concerning the rendering of ordinary rubber tires unserviceable after their customary period of usefulness.

Those versed in the art of rubber tire manufacture are aware that the ultimate breaking down of the tire in service is caused by the rupture or breaking of the cord structure or fabric reinforcement with which the tire is built up. Analysis of breaking down operation, as regards the cord or fabric structure, leads to the conclusion that this is due to the stretching or straining of the cord or fabric structure, sooner or later, to the limits of its ultimate strength. To illustrate, as a tire is being used, when it strikes an obstacle it is pushed inward at the point of impingement, and thereafter under the influence of the inflating pressure, the portion of the tire bulged inwards by contact, re-bounds outwards and places under stretch or strain to a maximum degree, or substantially so, the cord or fabric structure. At some stage in the service of the tire the cord or fabric structure cannot longer bear the strain, and its renitency being broken down it is ruptured and the end of its serviceability, for practical purposes is reached.

In the development of my invention hereof, my study of the action of the cord or fabric structure of the tire has led me to conclude, that the primary reason why the tire of to-day, made in accordance with latest up-to-date practise, involving a cord or fabric structure, has a life which is materially shortened, is because in the finished tire article of manufacture the said structure has imparted thereto a form or condition of substantially maximum "stretchability" or resiliency, and if subjected to the action of rupturing or stretching forces, greater than said maximum stretchability, breaking down of the cord or fabric structure is inevitable.

To exemplify, the foregoing, I refer to the customary method of producing rubber tires, in which the rubber stock or gum, and the cord structure or fabric are built up in the usual way and placed in a mold preliminary to vulcanization. An air bag is introduced into the tire structure thus made and expanded, correspondingly expanding the tire against the walls of the mold, stretching the cord or fabric structure and rubber stock, the tire being vulcanized while in this condition. Upon presentation of the thought, it will be clear that this process just described, which in one way or another, is commonly practised in the art, necessarily creates a tire structure in which the ultimate stretchability, or substantially the maximum resiliency of the cord or fabric structure is fixed therein, so to speak. It is this principle of tire manufacture which in my judgment tends to shorten the life of the tires of to-day, made by known processes. In this connection I might observe, moreover, that the cord or fabric structure incorporated with the gum or rubber stock, in the known processes of to-day, is dry and therefore at its maximum stretch.

In the carrying out of my invention, I proceed upon a theory of tire building which in so far as the incorporation of the rubber stock or gum, with the cord or fabric structure, is concerned, avails of principles which are totally opposed to those at present resorted to. To the above end, furthermore, I take advantage of my knowledge that the physical changes produced in a cord or fabric structure by the application of moisture thereto, and the drying thereof, are these: When the cord or fabric structure is wet it will shrink, and when it is dried it will stretch.

Applying the foregoing to tire manufacture, I utilize the theory of moistening the cord or fabric structure, incorporated with the rubber stock or gum, at some preliminary stage of the building of the combined structure or carcass, where vulcanization would render the shrinkage inactive, so as to produce a mechanical shrinkage of the cord or fabric structure, so that it becomes possessed of an inherent reserve stretchability, or resiliency, maintained therein, after the tire has become finally vulcanized, upon which reserve characteristic, the tire structure may draw, so to speak, in its operating functions under actual conditions of service; in other words, my tire when completed, contains a cord or fabric structure not stretched or expanded to its maximum degree of stretch or renitency, but having a substantially permanent shrinkage, which, while not interfering with its reinforcing function, permits it to expand or stretch to a degree materially greater than is possible on the part of the corresponding structure of present day tires, in which a substantially maximum degree of stretch or resiliency has been fixed in the fabric reinforcing structure thereof.

In concluding the above outline of the objective which I have sought in the design of my tire, I may note therefore that an ideal rubber tire structure made to afford a possible maximum of utility and service should be built with a predetermined amount of flexibility, resilience, or stretchability, of the cord or fabric structure, which is materially in excess of the maximum extent of possible flex or resilient stretch, or re-bound limit, of said fabric or cord structure, so that under all average conditions of use of the tire, the cord or fabric structure will never become subjected to its ultimate or maximum stretch, but will always have remaining resiliency or stretch to draw on for preventing the breaking or rupturing of the fabric. I have produced the nearest approach to the above ideal construction of tire by the process which I shall now describe, along with the tire article of manufacture itself.

In practise, I build up my tire, preliminarily, in much the usual way, either flat, or of core built shape by employing the usual plies of material forming the fabric or cord structure, and impregnating the same with gum or rubber stock in the usual way, excepting that the said structure is made somewhat wider than customary, by this I mean, for example, that where heretofore we have made a flat built tire of a width of say eleven and one-half inches from bead to bead, I now use a width of about twelve inches, for purposes that will be apparent hereinafter. I give these dimensions, approximately, and do not restrict myself to them particularly, as they are merely comparative.

The side walls and beads of the tire wall structure are built in the usual way, or in any way desired, as this is immaterial to the invention. The tire being completely built is now placed in a container or heater, submerged in water, preferably warm water, and a pressure of approximately one hundred and fifty pounds to the square inch is applied to the water and this produces, among others possibly, the following definite effects: First, the warm water softens the gum or rubber stock and the pressure in the container or heater impregnates the said gum or stock into and around the elements of the cord or fabric structure; second, the cord or fabric structure is completely impregnated with moisture. This shrinkage of the cord or fabric in the tire may be done by placing the tire in water, without pressure, and may be done at any time in any way before the rubber has become vulcanized or set to render the shrinkage inactive. The distinct advantage gained by shrinking the raw or built up tire under pressure is that all the air which is confined in the tire will come together or congregate in pockets when tire is subjected to pressure and can then be disposed of, for example by puncturing these pockets.

The length of time that the rubberized fabric is kept in water, naturally depends on the pressure applied to the water, which pressure drives the moisture into the fabric. I have found that with a water pressure of 150 lbs. per square inch a small tire will shrink in about ten minutes, but when employing water at 200 lbs. per square inch, the same result will be accomplished in about six minutes. Again, where a much less pressure is availed of, a correspondingly longer time will be necessary in order to obtain the same result. The time element depends on three factors, namely, the pressure of the water, the size and thickness of the tire, and to some degree, the temperature of the water.

The effect of the moisture impregnation of the cord or fabric structure, is to shrink the same by the shortening of the cords or elements of the fabric, and narrow up the built up tire, as previously described, so that after the shrinkage process is completed the tire width will approximate eleven inches from bead to bead, on the basis of the previously stated approximate dimensions. By shrinking the tire body or structure proper to a smaller width than heretofore utilized, I eliminate what is known as the buckling of the fabric or the cord structure, but this is not necessary. After the tire has been subjected to the shrinkage process described for approximately ten minutes, the water is drained off from the tire and the pressure relieved. If this is done with the action of the pressure, relief and water draining simultaneous, the pressure will tend to expedite the removal of the water from the heater or container in which the shrinkage operation is performed.

I now proceed to insert the air bag into the tire, place the tire in a mold in the usual way, heat the mold at vulcanizing temperature for the customary curing period after the known manner of today, as one method of carrying out my invention, if desired, and this may complete my process in adaptation thereof. Or, any other known or desirable method of curing to complete the tire, may be availed of, instead of utilizing the air bag pressure process. For instance, I may employ water pressure on the inside of the tire to force it against the walls of the mold in the curing operation. I mention these method to illustrate that I do not wish to be limited to any particular vulcanizing process, because in the broader phase of my invention I simply propose to initially shrink the cord or fabric structure of the tire, by any suitable method, and thereafter cure the tire with retention of the shrinkage effect thus produced in the said structure.

My preferred method of carrying out my invention however, involves somewhat different steps, subsequent to the completion of the shrinkage operation which I have described in connection with the container or heater in which the tires are submerged in water, previous to curing, with or without pressure. Instead of thereafter merely curing the tire by a known method, or any desirable method not now generally known, I prefer to semi-cure the tire at the stage just subsequent to shrinkage of the cord or fabric structure, and to a degree primarily sufficient to shape or set the tire. This semi-curing operation would involve a comparatively short curing period, say amounting to some fifteen to thirty minutes, more or less.

After the semi-cure of the tire, as just described, is completed, the tire is removed from the vulcanizing apparatus by which the semi-cure is performed, and is then preferably cooled within the mold in which it was placed in said vulcanizing apparatus. The cooling may be done in any suitable way, as by turning water on to the mold, and my object in cooling the tire in this way is to prevent possibility of separation of the rubber and cord or fabric structure, or "blows" so-called. If not cooled in this manner, the gases in the tire would blow the elements thereof apart.

The tires now having been cooled subsequent to the semi-curing operation, are now removed from the molds and each tire is placed in a vulcanizing apparatus or heater by being suspended therein from a suitable support or hanger. A siphon pipe or device is inserted in the bottom hollow portion of the tire and may consist of a length of pipe having a laterally and downward upper bent portion or goose-neck which enters said lowermost hollow portion of the tire, extending from a vertical straight portion of greater length than the curved portion to insure a siphoning action. The tire thus placed in position in said vulcanizing heater, the latter is closed and the tire is submerged in water, preferably heated water. The temperature of the water is brought up to the desired curing temperature, and vulcanization or final curing effected.

As the water enters the vulcanizing apparatus or heater just above referred to, the tire suspended therein, or many tires as the case may be, cools a part of the water and some of this cooler water will pocket in the lower part of the tire. But the siphon promptly operates to immediately move this cooler water into circulation with the main body of water in the heater, so that uniformity of curing action over the whole body of the tire is ensured, because the water at its maximum heat or temperature is brought into contact with all parts of said tire. It will be understood of course, that in the final curing operation just described, the tires are submerged in the water in the vulcanizing apparatus or heater.

During the final curing or vulcanizing, I may provide in the curing heater, though not necesessarily so, pressure in excess of the temperature pressure, and approximating one hundred and fifty pounds per square inch. This external pressure acts on the water and thereby on the tires to prevent "blows" or separation of the rubber and fabric structure, and moreover, the application of this pressure has a materially compacting or densifying effect upon the rubber stock or gum. In the final curing operation just being described, I maintain the vulcanizing temperature, and the said pressure, if the latter is employed, for a predetermined time which will be materially less than the usual required time incident to the curing of the tires in their molds, due to the heating of the tires from all sides, inside and outside to be more specific.

As inferred in the foregoing description, I may finally cure the tire without application of pressure under certain conditions, as for instance, when the semi-curing operation is longer than the period previously suggested. Such longer semi-curing would compact or densify the rubber stock so that it would not be influenced by the later application of pressure. Instead of the final curing operation as described above, I may perform the final vulcanization by resorting to any known types of vulcanizing apparatus, availing of the open steam vulcanizing method or any other desired. In every case, however, the tire is subjected to the previous shrinking process.

After the final vulcanizing operation is completed, however, said operation may be performed, the tires are cooled in the atmosphere, or under standard conditions. If the water vulcanizing method is employed for final curing, the water will be removed from the vulcanizing heater and during this operation, the siphon means acts to remove the water from the lower hollow pockets of the tire. Under these conditions, it will be evident that said siphon means performs a dual function, i. e., it maintains circulation of the water for uniformity of heating when the vulcanizing heater is closed and operating, and draws out the water from the lower pocket of the tire, in the water removal operation.

The final step of cooling the tire in the atmosphere is important, because such cooling enables the moisture in the tire to pass off in the form of gas, instead of condensing into water as would be the case if the tire were cooled quickly, save by the cold water cure. The importance of this method of cooling will be evident when it is understood that should the said moisture in any substantial quantity remain impregnated in the tire structure the cord or fabric structure would mildew or rot in time and become so deteriorated as to reduce the success possibilities of the invention.

As regards my longer process adaptation of my invention, by way of recapitulation, I might summarize the essential steps as follows:

1. Tire structure built as usual, except larger.
2. Shrinking process for the cord or fabric structure performed.
3. Semi-cure completed.
4. Tire cooled, condensing gases into moisture to maintain condition of shrinkage of cord or fabric structure.
5. Tire removed from mold.
6. Final curing completed preferably in water, or by open steam or other process, cord or fabric structure still in shrunken condition.
7. Tire cooled in atmosphere causing moisture to escape in form of gas, drying the cord or fabric structure so that the latter will be stretched somewhat, but to a predetermined degree which is less than its maximum degree of stretchability or resilience.

While I actually make the tire structure narrower or smaller in reality, and then slightly stretch the same by the air bag, water, or other method to fill its mold, the fabric or cord structure is never stretched to its ultimate or maximum length because at such time it is moist or shrunk, thus having a condition which is exactly opposite that incident to ordinary processes that may be said to be universally used today. In my final complete tire ready for use the predetermined stretch of the cord or fabric structure obtained by me according to my process is less than the ultimate re-bound or stretching limit of said structure and constitutes the main achievement of my invention.

I use the terms cord structure and fabric structure herein, in an interchangeable sense and as referring to the ordinary reinforcing structure used in cord and similar tires. I also use the term stretchability, though it may not be a dictionary word, because it is significant particularly for the purposes of this description and especially appropriate in describing the way in which my cord or fabric structure functions.

It is apparent that my process may be practised by a short method first described, and by longer method, later described. However, I do not wish to be limited to the exact steps of either method as outlined as they are mainly typical, though generically and specifically new. Certain of the steps of each method might be omitted, however, because it is possible to impregnate cord or fabric structures in different ways, or in other words, my shrinkage method may be carried out by different means or processes.

I have failed to find any difference, and fail to see how there can be any difference in the result by using different kinds of gum stock in its raw or uncured condition or in any other condition.

The same result, in following out the steps of my invention, is obtained by the use of what is known to the trade as square woven fabric or of cord fabric.

My invention involves a new process, a new article of manufacture, and to some extent a new apparatus, the last however, being a separate subject matter of invention herefrom.

Having thus described my invention, what I claim as new and desire to secure by Letters Patent of the United States, is:—

1. The process of making a rubber tire of rubber stock and reinforcing cord structure, consisting of shrinking the cord structure, and curing the stock and cord structure together while the cord structure is in shrunken condition, to provide reserve stretching capacity for the cord structure.

2. The process of making a rubber tire of rubber stock and reinforcing cord structure, consisting of shrinking the cord structure, and curing the stock and cord structure together while the cord structure is in shrunken condition thereby partly stretching said cord structure only incident to drying in curing, which partial stretching reaches a limit materially less than the maximum possible stretch or expansion requirements of the structure under conditions of service of the tire.

3. The process of making a rubber tire, consisting of shrinking a cord structure by moisture, and incorporating the cord structure into the rubber of the tire in vulcanizing the two together so that a material part of the shrinkage of the cord structure is retained when the curing operation is completed.

4. The process of making a rubber tire, consisting of building a tire body composed of rubber stock and a cord structure, impregnating the latter with moisture to shrink it, and curing the tire body while the cord structure is so shrunken.

5. The process of making a rubber tire, consisting of building a tire body composed of rubber stock and a cord structure, impregnating the latter with moisture to shrink it, semi-curing the tire body and shaping it to form at such time, cooling the tire body to condense gases therein into moisture to maintain the cord structure shrunken, and then finally vulcanizing the tire body.

6. A process of making rubber tires, consisting of building up the usual tire body of rubber stock and cord or fabric structure, impregnating the said body with moisture under pressure to shrink the cord or fabric structure, and then curing the tire body.

7. A process of making rubber tires, consisting of building up the usual tire body of rubber stock and cord fabric structure, impregnating the said body with moisture under pressure to shrink the cord or fabric structure, partly curing the body, cooling the body to condense the gases therein to maintain the cord or fabric structure moist, and finally curing the body to produce a tire having a cord or fabric structure stretched to materially less than the maximum re-bound stretching requirements of the tire under service conditions.

8. A process of making rubber tires, consisting of building up the usual tire body of rubber stock and cord or fabric structure, impregnating the said body with moisture to shrink the cord or fabric structure, and then curing the tire body finally, and cooling the tire in the atmosphere to cause moisture therein to pass off in gaseous state.

9. The process of making a rubber tire, consisting of building a tire body composed of rubber stock and a cord structure, impregnating the later with moisture to shrink it, and curing the tire body while the cord structure is so shrunken, to a state of partial vulcanization, cooling the tire body in such a way that the gases therein are condensed to maintain moisture in the cord structure, finally vulcanizing the body, and cooling the body in such a way that moisture contained therein will pass off in a gaseous state.

10. A process of making rubber tires, consisting of building up the usual tire body of rubber stock and cord fabric structure, impregnating the said body with moisture to shrink the cord or fabric structure, partly curing the body, cooling the body to condense the gases therein to maintain the cord or fabric structure moist, and finally curing the body to produce a tire having a cord or fabric structure stretched to materially less than the maximum re-bound stretching requirements of the tire under service conditions.

11. The process of making rubber articles, consisting of building up a body of rubber stock and fabric structure after a known manner, shrinking the fabric structure by application of moisture, shaping the body to form, curing the body whilst the moisture remains in the fabric structure so that the latter will not be stretched to its ultimate limit of expansion, and removing the said moisture.

12. The process of making rubber articles, consisting of building up a body of rubber stock and fabric structure after a known manner, shrinking the fabric structure by application of moisture, shaping the body to form, curing the body whilst the moisture remains in the fabric structure so that the latter will not be stretched to its ultimate limit of expansion, and removing the said moisture, by cooling under atmospheric conditions compelling passing off of the moisture in gaseous state.

13. The process of making rubber articles, consisting of building up a body of rubber stock and fabric structure after a known manner, shrinking the fabric structure by application of moisture, semi-curing the body to shape, cooling the body so as to condense gases therein to maintain fabric structure moist, then subjecting the body to final complete curing, and slowly cooling the body under atmospheric conditions to cause remaining moisture therein to pass off in gaseous state.

14. A process of making rubber articles, consisting of combining in a carcass or body, rubber stock and a fabric structure intended to reinforce the stock and to be tensioned in use in the completed articles, and vulcanizing the body into unity with the fabric structure set at materially less than its maximum expansibility under tension.

15. A process of making rubber articles, consisting of combining in a carcass or body, rubber stock and a fabric structure intended to reinforce the stock and to be tensioned in use in the completed article, and vulcanizing the body into unity with the fabric structure set at materially less than its maximum expansibility under tension, moistening the fabric structure to shrink it, curing the body whilst the fabric structure retains moisture, and cooling the body in such a way as to cause passing off of any moisture, in a gaseous state.

16. A process of making rubber tires as described in claim 7, in which the tire body is initially made wider than usually employed for a predetermined size tire.

In testimony whereof I affix my signature.
LAURITS A. LAURSEN.